(12) United States Patent
Friend et al.

(10) Patent No.: US 11,180,121 B2
(45) Date of Patent: Nov. 23, 2021

(54) PARKING BRAKE SETTING DEVICES AND SYSTEMS FOR TERMINAL TRACTORS

(71) Applicant: Toyota Motor Engineering & Manufacturing North America, Inc., Plano, TX (US)

(72) Inventors: Ronald Scott Friend, Jeffersonville, KY (US); Robert Aaron Allex, Ewing, KY (US); Brian McElroy, Winchester, KY (US); William T. Smith, Cynthiana, KY (US); David A. Britton, Florence, KY (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 212 days.

(21) Appl. No.: 16/518,087

(22) Filed: Jul. 22, 2019

(65) Prior Publication Data

US 2021/0024043 A1   Jan. 28, 2021

(51) Int. Cl.
*B60T 7/10* (2006.01)
*B60T 7/04* (2006.01)
*B60T 17/22* (2006.01)

(52) U.S. Cl.
CPC ............... *B60T 7/10* (2013.01); *B60T 7/045* (2013.01); *B60T 17/22* (2013.01)

(58) Field of Classification Search
CPC . B60T 17/22; B60T 7/10; B60T 7/101; B60T 7/104; B60T 7/045; B60T 15/041; B60T 17/16; B60R 25/086; B60R 25/066; G05G 5/28; Y10T 74/2063; Y10T 74/2093; E05B 13/04
See application file for complete search history.

(56) References Cited

U.S. PATENT DOCUMENTS

| 1,348,868 | A | * | 8/1920 | Green | B60R 25/066 70/206 |
|---|---|---|---|---|---|
| 1,362,685 | A | * | 12/1920 | Farah | B60R 25/066 70/251 |
| 3,508,625 | A | * | 4/1970 | Hawkins | H01L 21/2255 180/287 |
| 4,232,908 | A | * | 11/1980 | Stearns | B60T 13/263 303/13 |

(Continued)

FOREIGN PATENT DOCUMENTS

| CN | 105564414 B | 10/2018 |
|---|---|---|
| EP | 1308362 A1 | 5/2003 |
| JP | 2004352152 A | 12/2004 |

OTHER PUBLICATIONS

Handbrake warning alarm; (https://www.maplefleetservices.co.uk/product/handbrake-warning-alarm/); accessed Apr. 21, 2019.

(Continued)

*Primary Examiner* — Daniel D Yabut
(74) *Attorney, Agent, or Firm* — Dinsmore & Shohl LLP

(57) ABSTRACT

A terminal tractor includes a cabin and a parking brake system including a parking brake handle located in the cabin for activating a wheel brake. The parking brake handle has a lowered position where the wheel brake is disengaged and a raised position where the wheel brake is engaged. A parking brake setting device is located in the cabin that is configured to be located beneath a head of the parking brake handle with the parking brake handle in the raised position.

16 Claims, 5 Drawing Sheets

(56) References Cited

U.S. PATENT DOCUMENTS

| | | | | |
|---|---|---|---|---|
| 4,532,826 A * | 8/1985 | White | | B60T 7/08 |
| | | | | 74/502 |
| 4,679,668 A | 7/1987 | Washizu et al. | | |
| 4,792,023 A | 12/1988 | Washizu et al. | | |
| 4,877,294 A * | 10/1989 | Kuhn | | B60T 13/38 |
| | | | | 303/9 |
| 5,251,967 A * | 10/1993 | Eberling | | B60T 13/263 |
| | | | | 303/7 |
| 5,375,916 A * | 12/1994 | Cook | | B60R 25/08 |
| | | | | 303/89 |
| 5,560,233 A * | 10/1996 | Watkins | | B60R 25/007 |
| | | | | 137/383 |
| 5,688,027 A * | 11/1997 | Johnson | | B60R 25/08 |
| | | | | 188/353 |
| 5,735,147 A * | 4/1998 | Cattanach | | B60R 25/08 |
| | | | | 137/382 |
| 5,760,683 A * | 6/1998 | Barr | | E05B 77/54 |
| | | | | 200/61.88 |
| 5,839,304 A * | 11/1998 | Wills | | B60T 17/16 |
| | | | | 70/175 |
| 6,062,652 A * | 5/2000 | Eberling | | B60T 13/263 |
| | | | | 303/64 |
| 6,188,941 B1 * | 2/2001 | Hwang | | B60R 25/00 |
| | | | | 307/10.6 |
| 9,940,816 B2 | 4/2018 | Cavaliere et al. | | |
| 10,703,270 B1 * | 7/2020 | Williams | | B60Q 9/002 |
| 10,953,859 B2 * | 3/2021 | Griesser | | B60T 15/041 |
| 2001/0026212 A1 * | 10/2001 | Strohbeck | | B60R 25/066 |
| | | | | 340/5.6 |
| 2003/0062766 A1 * | 4/2003 | Bottiglieri | | B60T 17/22 |
| | | | | 303/89 |
| 2008/0141503 A1 * | 6/2008 | Smith | | B60T 17/221 |
| | | | | 24/455 |
| 2014/0175814 A1 * | 6/2014 | Holsopple | | E05B 13/04 |
| | | | | 292/348 |
| 2017/0137002 A1 * | 5/2017 | Taneyhill | | B60T 15/223 |

OTHER PUBLICATIONS

Scorpion VA8ISO handbrake alert; (https://www.scorpionauto.com/hgv-handbrake-alert-scorpion-va8iso/) accessed Apr. 21, 2019.

\* cited by examiner

PARKING BRAKE SETTING DEVICES AND SYSTEMS FOR TERMINAL TRACTORS

TECHNICAL FIELD

The present specification generally relates to parking brake setting systems for vehicles and, more specifically, to parking brake setting devices and systems for terminal tractors.

BACKGROUND

Terminal tractors, sometimes referred to as shunt trucks, are semi-tractors that move semi-trailers from location to location within a facility, such as a vehicle manufacturing facility. The terminal tractors typically include a fifth-wheel coupling with a lifting mechanism to raise and lower the fifth-wheel coupling in order to connect and disconnect from the semi-trailers in an efficient manner. Because the terminal tractors typically move the semi-trailers over relatively short distances compared to regular road trucks, an operator of the terminal tractors may enter and exit the terminal tractors several times during a typical day. The terminal tractors may include parking brakes that are used to keep the terminal tractors motionless when parked. The parking brakes may be manually operated and set by the operator of the terminal tractors before exiting the terminal tractors. While setting of the parking brakes may be routinely desired, such setting of the parking brakes may not occur for various reasons. Accordingly, a need exists for parking brake setting devices and systems for motor truck tractors that require the operator to set the parking brakes before exiting the terminal tractors.

SUMMARY

In accordance with one embodiment, a terminal tractor includes a cabin and a parking brake system including a parking brake handle located in the cabin for activating a wheel brake. The parking brake handle has a lowered position where the wheel brake is disengaged and a raised position where the wheel brake is engaged. A parking brake setting device is located in the cabin that is configured to be located beneath a head of the parking brake handle with the parking brake handle in the raised position.

In another embodiment, a method of controlling usage of a parking brake of a terminal tractor is provided. The method includes placing a parking brake handle in a raised position to engage a wheel brake. The parking brake is located in a cabin of the terminal tractor. A parking brake device is located beneath a head of the parking brake handle. A circuit is closed by connecting an electrical connector of the parking brake device to an electrical connector of a door lock system.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following description of the illustrative embodiments can be understood when read in conjunction with the following drawings, where like structure is indicated with like reference numerals and in which:

DETAILED DESCRIPTION

Terminal tractors according to the present specification include a passenger cabin and are frequently used to move semi-trailers from an initial location to a different location within a facility, such as a manufacturing facility. The terminal tractors may be configured to efficiently connect and disconnect from the semi-trailers in order to facilitate several moving operations a day. In this regard, the terminal tractors may have a fifth wheel coupling that is used to connect to the semi-trailers that includes a lifting mechanism that can be used to raise and lower the fifth wheel coupling using, for example, hydraulic pressure. The terminal tractors may include a single-person cab for an operator of the terminal tractors to operate the terminal tractors. Because the terminal tractors are often used to move the semi-trailers relatively short distances compared to regular road trucks, the operators may perform several moving operations in a day and be required to frequently enter and exit the terminal tractors. The terminal tractors include parking brakes that are manually operated for holding the terminal tractors motionless when unoccupied. A parking brake setting system includes a parking brake setting device that is used to require the operator to manually set the parking brakes before exiting the terminal tractors. The parking brake setting device is sized and shaped to fit under parking brake pull handles only after the parking brake pull handles have been pulled and set. Once positioned, the parking brake setting device completes a circuit that allows operation of a door lift handle to open an associated door.

Figure 1:
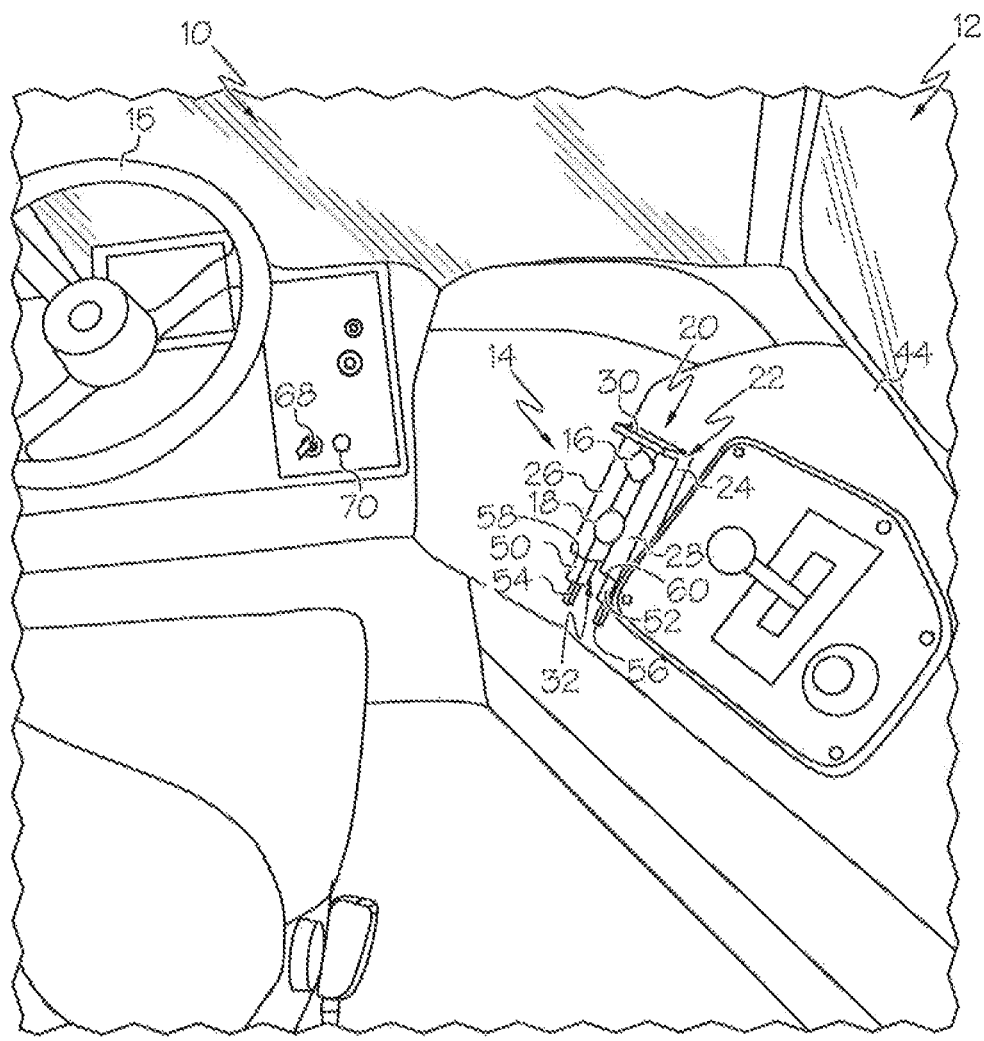
FIG. 1 schematically depicts a partial view of a terminal tractor including a parking brake setting system, according to one or more embodiments shown and described herein.

As used herein, the term "longitudinal direction" refers to the forward-rearward direction of the terminal tractor (i.e., in the +/− Y direction depicted in FIG. 1). The term "lateral direction" refers to the cross-terminal tractor direction (i.e., in the +/− X direction depicted in FIG. 1), and is transverse to the longitudinal direction. The term "vertical direction" refers to the upward-downward direction of the terminal tractor (i.e., in the +/− Z-direction depicted in FIG. 1). As used herein, "upper" and "above" are defined as the positive Z direction of the coordinate axis shown in the drawings. "Lower" and "below" are defined as the negative Z direction of the coordinate axis shown in the drawings.

Referring to FIG. 1, the terms "outboard" or "outward" as used herein refers to the relative location of a component in a direction with respect to a truck centerline. The term "inboard" or "inward" as used herein refers to the relative location of a component in a direction with respect to the pickup truck centerline. Because the terminal tractor structures may be generally symmetrical about the pickup truck centerline, the direction to which use of terms "inboard,"

"inward," "outboard" and "outward" refer may be mirrored about the pickup truck centerline when evaluating components positioned along opposite sides of the terminal tractor 10.

Referring to FIG. 1, the terminal tractor is generally illustrated at 10. The terminal tractor 10 includes a driver cabin 12 and other components that may be typically found on a terminal tractor, such as commercially available from Kalmar Ottawa in Ottawa, Kans. For example, the terminal tractor 10 may include a fifth wheel coupling behind the driver cabin 12 in the longitudinal direction that pivots in the vertical direction between raised and lowered positions in order to connect and disconnect from a semi-trailer. Additional features of terminal tractors are described in U.S. Pat. No. 6,971,657, which is incorporated by reference as if fully set forth herein.

The terminal tractor 10 includes a parking brake system 14 that includes a pair of parking brake handles 16 and 18 that are located outboard of a steering wheel 15. The parking brake handles 16 and 18 are straight pull handles that are each connected to a pair of wheel brakes, for example, by a cable in order to set and release the wheel brakes by pulling and pushing the parking brake handles 16 and 18. For example, one of the parking brake handles 16, 18 may be connected to wheel brakes of rear wheels and the other parking brake handle 16, 18 may be connected to wheel brakes of front wheels. While straight pull handles are shown, other types of parking brake handles may be used such as a hand-operated lever that can be raised in order to set the wheel brakes and lowered in order to release the wheel brakes.

Figure 2:
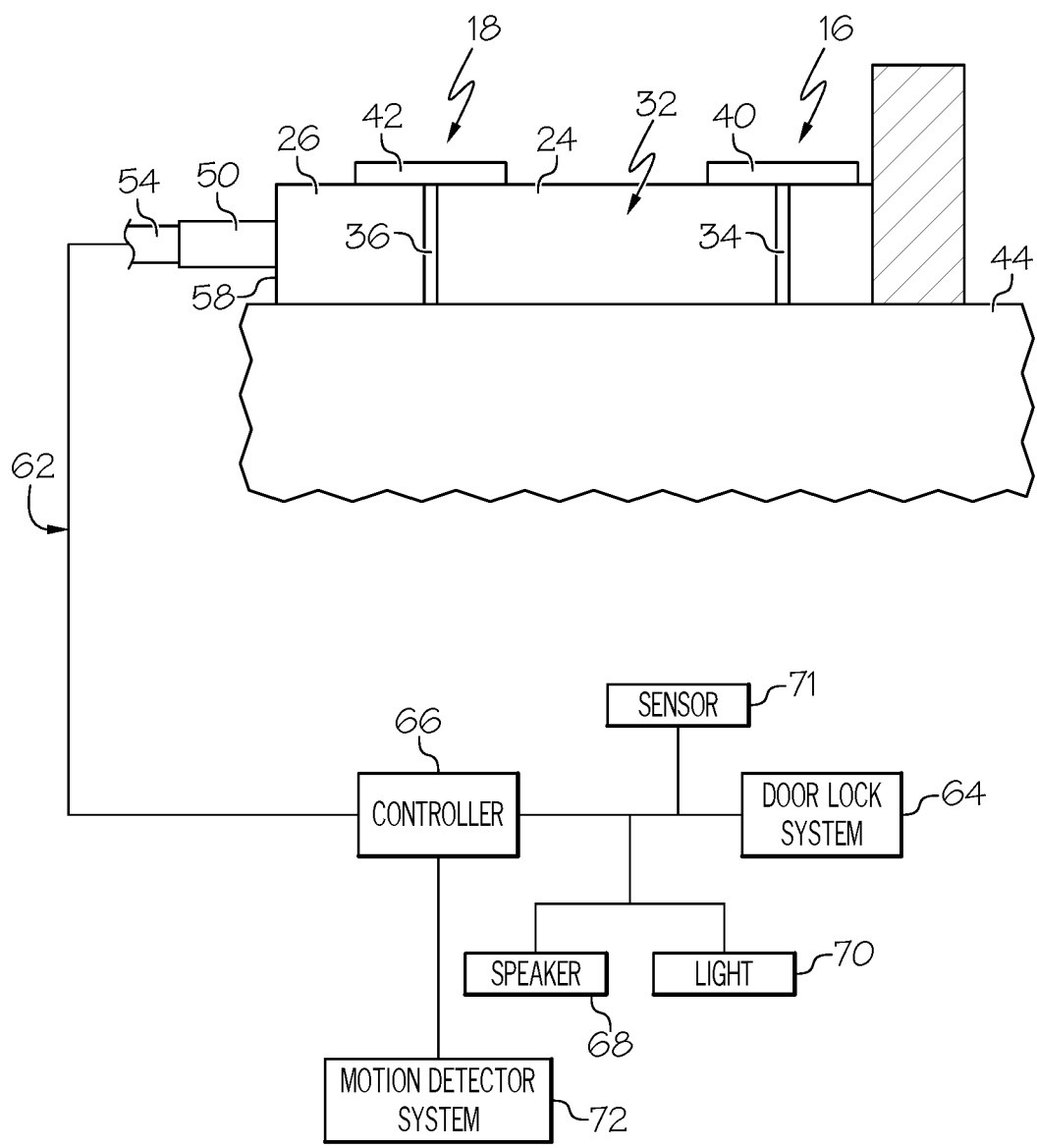
FIG. 2 schematically depicts a section view of a parking brake setting device in use, according to one or more embodiments shown and described herein.

The terminal tractor 10 includes a parking brake setting system 20 that includes a parking brake setting device 22. The parking brake setting device 22 includes a body 24 that includes a first leg 26 that is connected to a second leg 28 by an interconnecting wall 30 that spans a slot 32 that is located between the first leg 26 and the second leg 28. Referring to FIG. 2, the slot 32 has a width that is sized to receive rods 34 and 36 of the parking brake handles 16 and 18 with the parking brake handles 16 and 18 in raised positions. The slot 32 also has a length to receive both rods 34 and 36 of the parking brake handles 16 and 18. The width of the slot 32 may be less than widths of heads 40 and 42 of the parking brake handles 16 and 18 such that the parking brake setting device 22 slides underneath the heads 40 and 42 along instrument panel 44. The body 24 has a height such that the heads 40 and 42 of the parking brake handles 16 and 18 will prevent the parking brake setting device 22 from sliding into position with the parking brake handles 16 and 18 in the lowered positions.

Referring to FIGS. 1 and 2, the parking brake setting device 22 includes two electrical connectors 50 and 52 that are located on end 58 and 60 of the body 24. For example, the electrical connectors 50 and 52 may be 12-volt connectors. The electrical connectors 50 and 52 may be electrically connected together (e.g., through or along the body using an electrical wire) to complete a circuit by inserting mating electrical connectors 54 and 56 into the electrical connectors 50 and 52. In some embodiments, the electrical connectors 54 and 56 may be mounted to the instrument panel 44 such that sliding the brake setting device 22 into position automatically connects the electrical connectors 50, 52, 54 and 56 to complete a circuit 62.

Referring particularly to FIG. 2, the circuit 62 is connected to a door lock system 64 of the terminal tractor 10. If the circuit is not completed using the parking brake setting device 22, the door lock system 64 will remain in a locked configuration thereby preventing exit of the operator. Once the circuit 62 is completed using the parking brake setting device 22, as described above, the door lock system 64 can be placed into an unlocked configuration using a switch and/or controller. In some embodiments, completing the circuit 62 sends a signal to a controller 66 that instructs the door lock system 64 to automatically unlock.

Referring again to FIGS. 1 and 2, the parking brake setting system 14 further includes one or more output devices, such as a speaker 68 and a light 70. In some embodiments, if the operator attempts to open the door without a complete circuit 62, the controller 66 may activate the light 70 to provide a visual indication of the door lock system 64 being in the locked configuration and the speaker 68 to provide an audible indication of the door lock system 64 being in the locked configuration. In some embodiments, a position sensor 71 may be used by the controller 66 to monitor a door handle and provide a signal to the controller 66 when the door handle is being moved.

Figure 3:
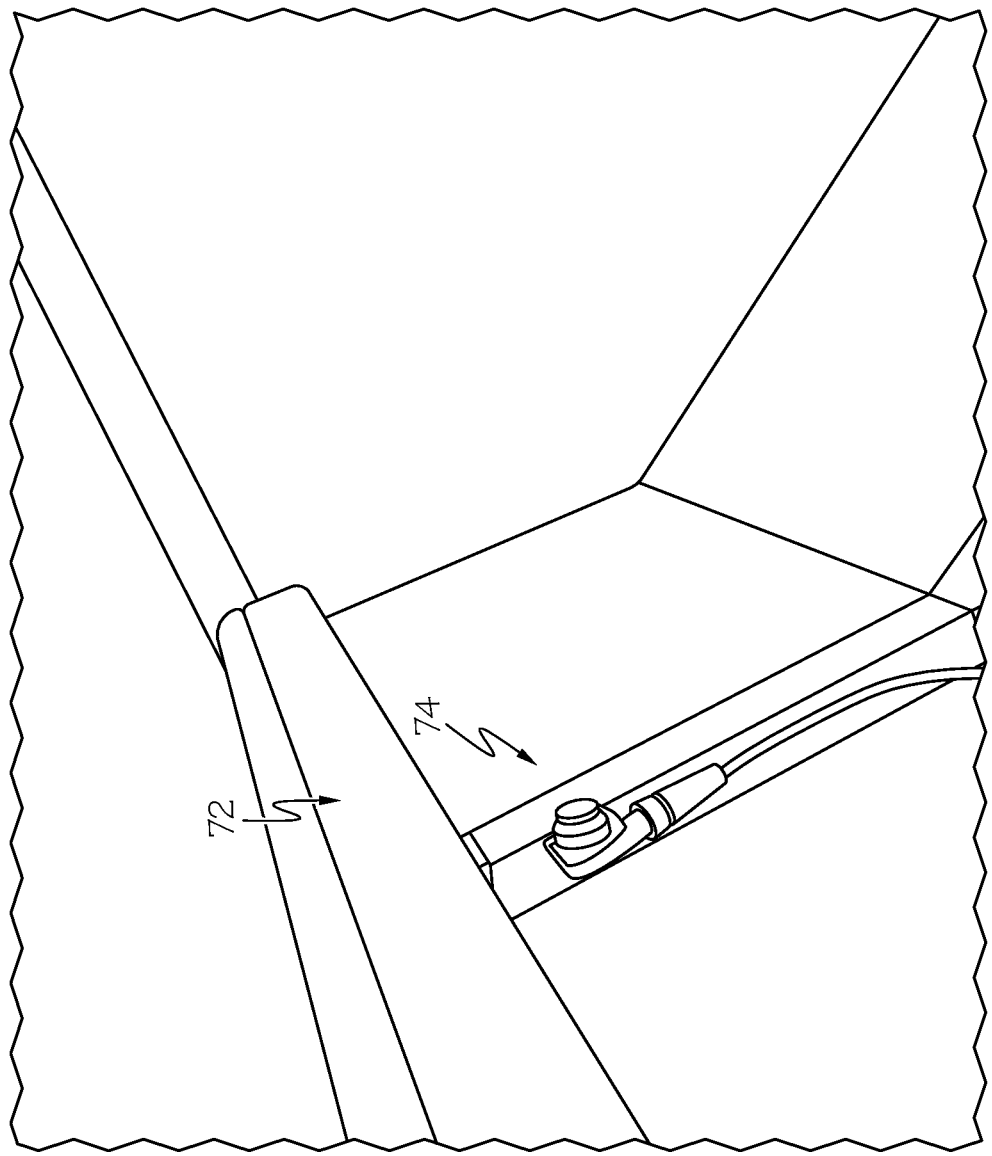
FIG. 3 schematically depicts a partial view of a cabin of the terminal tractor of FIG. 1 including a motion detector system, according to one or more embodiments shown and described herein.
Figure 4:
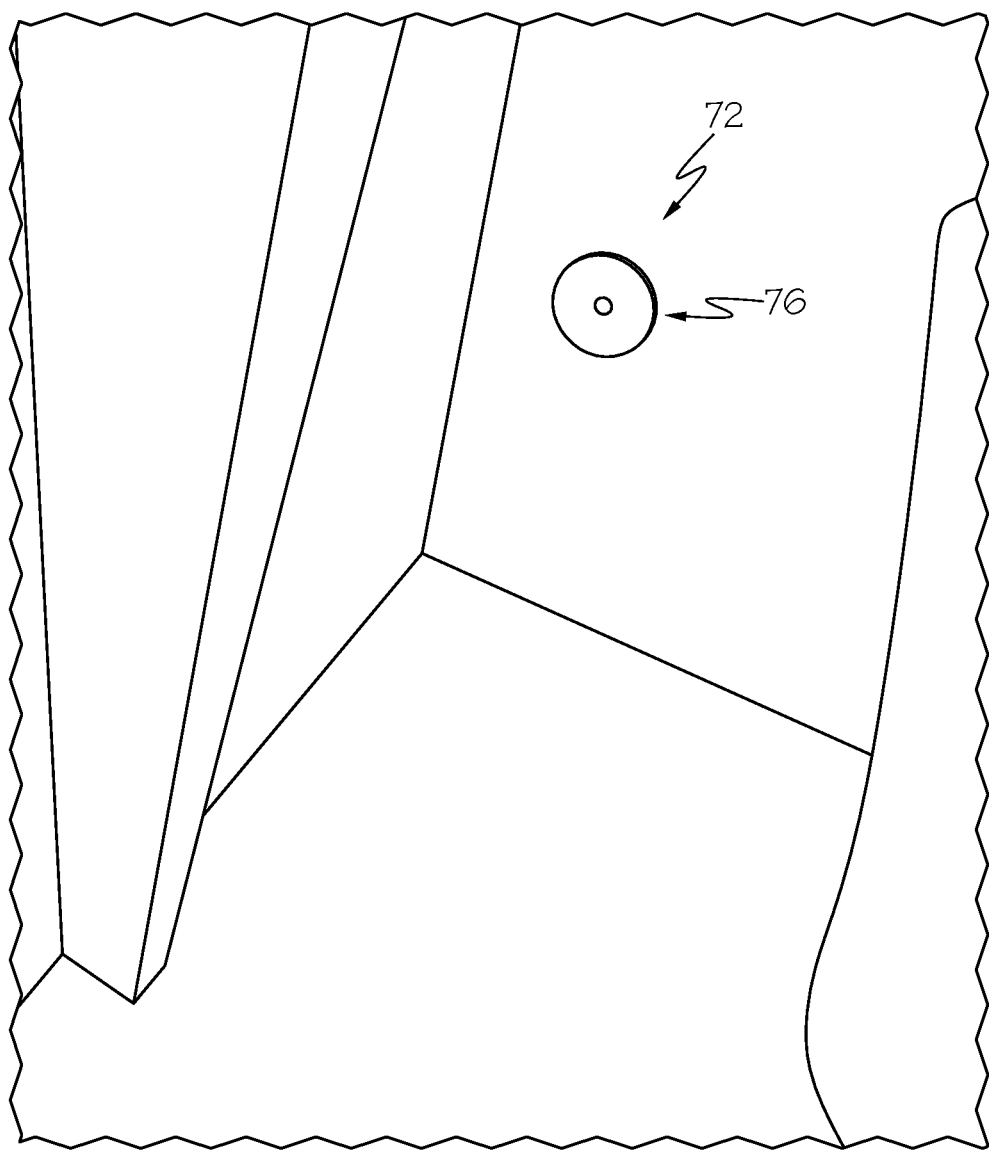
FIG. 4 schematically depicts another view of the cabin including the motion detector system of FIG. 3, according to one or more embodiments shown and described herein.

Referring to FIGS. 3 and 4, in some embodiments, the parking brake setting system 20 may include a motion detector system 72 that is used to monitor when the operator enters and exits the terminal tractor 10. In this example, the motion detector system 72 may include, for example, a laser sensor 74 (FIG. 3) and a reflector 76 (FIG. 4). If the operator interrupts a light beam from the laser sensor 74, the controller 66 may instruct the light 70 to provide a visual indication and the speaker to provide an audible indication of the circuit 62 not being completed. In another embodiment, the controller 66 may monitor the parking brake system 14 to determine whether the parking brakes have been set when the terminal tractor 10 is turned off. If the motion detector system 72 detects the operator leaving the terminal tractor 10 without setting the parking brakes, the controller 66 may instruct the light 70 to provide a visual indication and the speaker to provide an audible indication of the parking brakes not being set.

Figure 5:
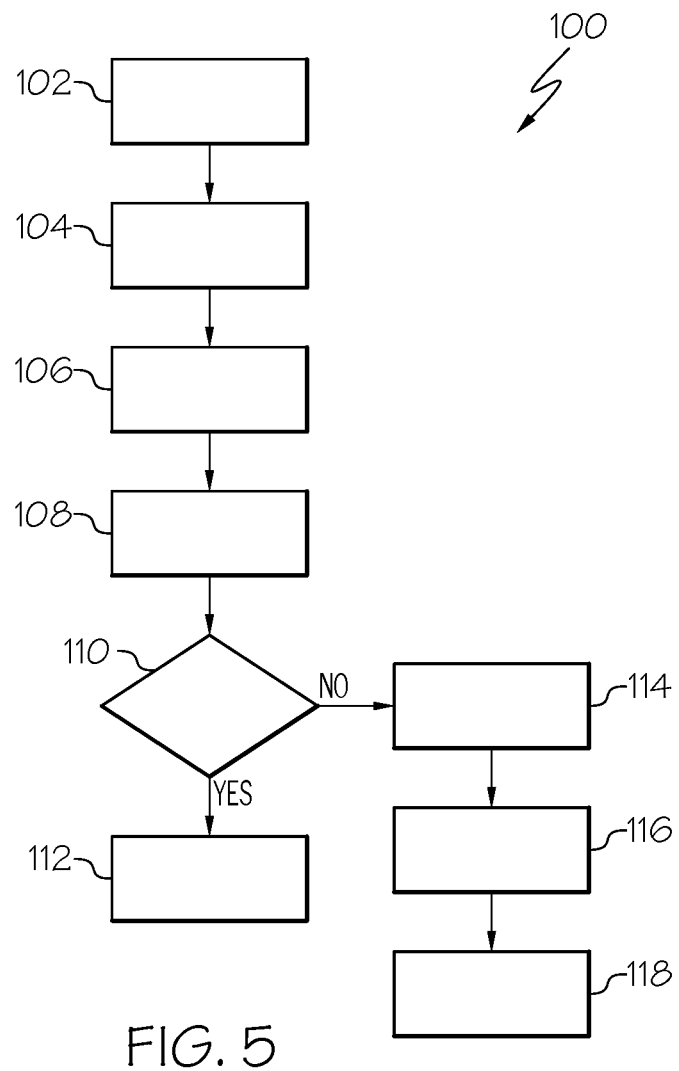
FIG. 5 illustrates a method of controlling parking brake usage, according to one or more embodiments shown and described herein.

Referring to FIG. 5, a method 100 of controlling parking brake usage using a parking brake setting system includes providing a parking brake device at step 102. At step 104, the parking brake handles are manually placed in their raised configurations to set the parking brakes. At step 106, the parking brake device is placed underneath heads of the parking brake handles. At step 108, a circuit is completed by connecting electrical connectors of the parking brake device to electrical connectors of a door lock system. At step 110, a controller monitors whether the circuit has been completed. If the circuit has been completed, the controller places the door lock system in an unlocked configuration at step 112. If the circuit has not been completed, the controller places the door lock system in a locked configuration at step 114. The controller also monitors the door handle to determine whether an operator is attempting to open the door with the door lock system in the closed configuration at step 116. The controller activates a light and speaker to provide visual and audible alarms at step 118 if the operator attempts to open the door without completing the circuit.

The above-described speaker systems include parking brake setting systems that control usage of the parking brakes by preventing the operator from leaving the terminal tractors without setting the parking brakes and/or providing an alarm, such as a light or sound if the operator attempts to leave the terminal tractors without setting the parking brakes. The parking brake setting systems include a parking brake setting device that slides underneath heads of the parking brake handles with the parking brake handles in raised configurations. The parking brake devices include electrical connectors that connect to electrical connectors of a door lock system to complete a circuit. Once the circuit is completed, the operator may be able to open the door and leave the terminal tractor. By the parking brake devices' presence, an indication to the operator and others can be provided that the parking brakes are set.

While pickup trucks are described above, the speaker systems may be mounted in a sedan or SUV type of vehicle. The speaker enclosure may be externally mounted underneath the vehicle or rear bumper, depending on package restrictions and mounting location. Size and shape of the speaker enclosure may be selected depending on package restrictions of the vehicle.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A terminal tractor comprising:
   a cabin;
   a parking brake system comprising a parking brake handle located in the cabin for activating a wheel brake, the parking brake handle having a lowered position where the wheel brake is disengaged and a raised position where the wheel brake is engaged; and
   a parking brake setting device located in the cabin that is configured to be located beneath a head of the parking brake handle with the parking brake handle in the raised position to provide an indication that the parking brake handle is in the raised position;
   wherein the parking brake setting device comprises an electrical connector that connects to a door lock system to close a circuit with the parking brake setting device located beneath the head of the parking brake handle and disconnects from the door lock system to open the circuit with the parking brake setting device removed from beneath the head of the parking brake handle.

2. The terminal tractor of claim 1, wherein the parking brake setting device has a height to be located beneath the head of the parking break handle only with the parking brake handle in the raised position.

3. The terminal tractor of claim 1, wherein the door lock system comprises an electrical connector that connects with the electrical connector of the parking brake setting device.

4. The terminal tractor of claim 1, wherein the parking brake setting device comprises a body that includes a first leg and a second leg that is connected to the first leg by an interconnecting wall, the interconnecting wall spans a slot between the first leg and the second leg.

5. The terminal tractor of claim 4, wherein the slot is sized to receive a pair of parking brake handles with the parking brake handles in raised positions.

6. The terminal tractor of claim 1 further comprising a controller that detects when the circuit is closed and places the door lock system in an open configuration.

7. The terminal tractor of claim 6, wherein the controller places the door lock system in a locked configuration when the circuit is open.

8. The terminal tractor of claim 1 further comprising a motion detector system that monitors when an operator enters and leaves the cabin.

9. A method of controlling usage of a parking brake of a terminal tractor, the method comprising:
   placing a parking brake handle in a raised position to engage a wheel brake, the parking brake located in a cabin of the terminal tractor;
   locating a parking brake setting device beneath a head of the parking brake handle; and
   closing a circuit by connecting an electrical connector of the parking brake setting device to an electrical connector of a door lock system;
   wherein the parking brake setting device comprises the electrical connector that connects to the door lock system to close the circuit with the parking brake setting device located beneath the head of the parking brake handle and disconnects from the door lock system to open the circuit with the parking brake setting device removed from beneath the head of the parking brake handle.

10. The method of claim 9 further comprising placing the door lock system in an unlocked configuration after the step of closing the circuit.

11. The method of claim 10 further comprising:
    opening the circuit by disconnecting the electrical connector of the parking brake setting device from the electrical connector of the door lock system; and
    placing the door lock system in a locked configuration after the step of opening the circuit.

12. The method of claim 9, wherein the parking brake setting device has a height to be located beneath the head of the parking break handle only with the parking brake handle in the raised position.

13. The method of claim 9, wherein the parking brake setting device comprises a body that includes a first leg and a second leg that is connected to the first leg by an interconnecting wall, the interconnecting wall spans a slot between the first leg and the second leg.

14. The method of claim 13, wherein the slot is sized to receive a pair of parking brake handles with the parking brake handles in raised positions.

15. The method of claim 9 further comprising detecting when the circuit is closed using a controller.

16. The method of claim 9 further comprising monitoring when an operator leaves the cabin using a motion detector system.

* * * * *